US010326334B2

(12) United States Patent
Larjola et al.

(10) Patent No.: US 10,326,334 B2
(45) Date of Patent: Jun. 18, 2019

(54) ELECTRICAL TURBO-MACHINE AND A POWER PLANT

(71) Applicant: LAPPEENRANNAN TEKNILLINEN YLIOPISTO, Lappeenranta (FI)

(72) Inventors: Jaakko Larjola, Helsinki (FI); Juha Pyrhonen, Lappeenranta (FI); Jari Backman, Lappeenranta (FI)

(73) Assignee: LAPEENRANNAN-LAHDEN TEKNILLINEN YLIOPISTO LUT, Lapeenranta (FI)

( * ) Notice: Subject to any disclaimer, the term of this patent is extended or adjusted under 35 U.S.C. 154(b) by 76 days.

(21) Appl. No.: 15/122,858

(22) PCT Filed: Mar. 2, 2015

(86) PCT No.: PCT/FI2015/050124
§ 371 (c)(1),
(2) Date: Aug. 31, 2016

(87) PCT Pub. No.: WO2015/132462
PCT Pub. Date: Sep. 11, 2015

(65) Prior Publication Data
US 2017/0054344 A1 Feb. 23, 2017

(30) Foreign Application Priority Data
Mar. 5, 2014 (EP) .................................... 14157756

(51) Int. Cl.
*H02K 1/32* (2006.01)
*H02K 7/18* (2006.01)
(Continued)

(52) U.S. Cl.
CPC ............. *H02K 7/1823* (2013.01); *F01K 7/16* (2013.01); *F01K 13/00* (2013.01); *F01K 15/00* (2013.01);
(Continued)

(58) Field of Classification Search
CPC .......... H02K 7/1823; H02K 1/32; H02K 9/19; H02K 7/083; F01K 7/16; F01K 13/00; F01K 15/00
(Continued)

(56) References Cited

U.S. PATENT DOCUMENTS 4,394,593 A * 7/1983 Gocho ................... H02K 9/193
277/350
6,300,693 B1 10/2001 Poag et al.
(Continued)

FOREIGN PATENT DOCUMENTS

| CN | 101305510 | 11/2008 |
|---|---|---|
| WO | 2008/046957 A1 | 4/2008 |

OTHER PUBLICATIONS

International Search Report, dated Nov. 4, 2015, from corresponding PCT Application.
(Continued)

*Primary Examiner* — Terrance L Kenerly
(74) *Attorney, Agent, or Firm* — Young & Thompson

(57) ABSTRACT

An electrical turbo-machine includes a stator (101), a rotor (102), and a turbine section (110) driven with a working flow containing vaporizable material, for example water, in vaporized form. The rotor includes cooling channels (106-109) for conducting, through the rotor, a cooling flow containing the vaporizable material in liquid form. The rotor is arranged to conduct the cooling flow through an area where an impeller or impellers (111-114) of the turbine section are directly connected to the rotor and conduct the cooling flow to a same room to which the working flow comes out from the turbine section. The above-presented cooling system facilitates constructing the electrical turbo-machine as a hermetic structure in a power plant where bearings of the electrical turbo-machine are lubricated by the vaporizable material, a supply pump is directly connected to
(Continued)

the rotor, and the vaporizable material in gaseous form fills the gas spaces of the stator.

20 Claims, 5 Drawing Sheets

(51) Int. Cl.
    *H02K 9/19*       (2006.01)
    *F01K 7/16*       (2006.01)
    *F01K 13/00*     (2006.01)
    *F01K 15/00*     (2006.01)
    *H02K 7/08*       (2006.01)

(52) U.S. Cl.
    CPC ............... *H02K 1/32* (2013.01); *H02K 7/083* (2013.01); *H02K 9/19* (2013.01)

(58) Field of Classification Search
    USPC .......................................................... 310/54
    See application file for complete search history.

(56) References Cited

U.S. PATENT DOCUMENTS

| | | | |
|---|---|---|---|
| 6,369,478 B1 * | 4/2002 | Koharagi | H02K 1/276 310/156.23 |
| 8,080,908 B2 | 12/2011 | Matsubara et al. | |
| 2006/0113851 A1 * | 6/2006 | Ishihara | H02K 9/20 310/52 |
| 2008/0246281 A1 | 10/2008 | Agrawal et al. | |
| 2009/0261667 A1 | 10/2009 | Matsubara et al. | |

OTHER PUBLICATIONS

European Search Report, Jul. 9, 2014, from corresponding European Patent Application.

Chinese Office Action for Application No. 2015800121206, dated May 21, 2018, with English translation provided.

* cited by examiner

ELECTRICAL TURBO-MACHINE AND A POWER PLANT

FIELD OF THE INVENTION

The invention relates generally to rotating electrical machines. More particularly, the invention relates to an electrical turbo-machine suitable for operating as a turbo-generator of a power plant. Furthermore, the invention relates to a power plant for generating electrical energy.

BACKGROUND

Typical Rankine Cycle power plants are steam power plants where water is used as working fluid or Organic Rankine Cycle "ORC" power plants where suitable organic vaporizable material such as for example one of the siloxanes is used as the working fluid. In many cases, there can be technical and/or economic issues which determine the most advantageous size of a Rankine Cycle power plant. For illustrative purposes, steam power plants are discussed below in more details. In many traditional steam power plants, a shaft of a steam turbine is sealed with contactless labyrinth seals, and steam flows through the labyrinth seals to the ambient air and prevents the ambient air from leaking to the steam system of the steam power plant. Therefore, there is a continuous steam-flow out from the steam power plant. As a corollary, there is a need for water feeding equipment which produces sufficiently purified feed water for substituting the water removed by the above-mentioned steam-flow. Furthermore, when the steam power plant is stopped and the above-mentioned steam-flow through the labyrinth seals is also stopped, the ambient air flows into the steam system of the steam power plant. Thus, a sufficiently efficient mechanism is needed for removing the air from the steam system when the steam power plant is started again. Furthermore, in many traditional steam power plants, the shafts of the steam turbine and the generator are supported with oil lubricated bearings which necessitate rotary oil seals and an oil circulations mechanism. Furthermore, especially in small steam power plants, there can be an oil lubricated gear between the steam turbine and the directly-network-connected generator. Due to the above-mentioned facts, a practical lower limit for the nominal power of a traditional steam power plant is about 3-5 MW because traditional steam power plants smaller than this are typically not cost effective.

A hermetic steam power plant comprises an electrical turbo-machine where an impeller or impellers of a steam turbine is/are directly connected to a rotor of a generator section of the electrical turbo-machine. Furthermore, bearings of the electrical turbo-machine are lubricated by water, an impeller of a supply pump is directly connected to the rotor of the generator section, and gas spaces of the generator section are filled with steam. In a hermetic steam power plant of the kind described above, there is no need for steam-flows through the labyrinth seals to the ambient air, no need for an oil circulations mechanism for the bearings of the electrical turbo-machine, and no need for a gearbox. Furthermore, the vacuum pump of a condenser of the hermetic steam power plant can be very small in comparison with that of a traditional steam power plant. In the hermetic steam power plant, the purpose of the vacuum pump is only to eliminate a possible air leak occurring through flanged seals. Hence, there is no need for such complex mechanisms as in conjunction with traditional steam power plants. Thus, a hermetic steam power plant can be cost effective also in cases where the nominal power is small. It is worth noting that the operating cycle of a hermetic power plant of the kind described above can also be based on vaporizable material other than water. For example, suitable organic vaporizable material such as for example one of the siloxanes can be used instead of water.

A hermetic power plant of the kind described above is, however, not free from challenges. One of the challenges is related to the cooling of the generator. Publication WO2008046957 describes a steam power plant where steam exiting from the turbine is circulated in the gas-space of the generator in order to cool the generator with the above-mentioned steam. The steam exiting the turbine can be, however, too hot for cooling the generator especially in cases where the steam power plant is a back-pressure power plant used for producing for example district heat. Using the hot steam for the cooling of the generator can be quite challenging because the hot steam may cause unwanted hydrolysis reactions which tend to damage typical electrically insulating materials. The damaging effect caused by the hydrolysis gets worse when the temperature rises.

SUMMARY

The following presents a simplified summary in order to provide a basic understanding of some embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electrical turbo-machine that is suitable for being used, for example but not necessarily, as a turbo-generator of power plant. An electrical turbo-machine according to the invention comprises a stator, a rotor, and a turbine section comprising one or more turbine impellers and capable of being driven with a working flow containing vaporizable material, for example water, in vaporized form. The rotor of the electrical turbo-machine comprises:

first and second shaft sections so that the one or more turbine impellers are directly connected to the second shaft section, an electromagnetically active section between the first and second shaft sections in the axial direction of the rotor and for generating torque when magnetically interacting with the stator and, and cooling channels for receiving a cooling flow at the first shaft section, for conducting the cooling flow to the second shaft section, and for conducting the cooling flow out from the second shaft section.

The second shaft section is arranged to conduct the cooling flow through an area where the one of more turbine impellers are directly connected to the second shaft section and to conduct the cooling flow to a same room to which the working flow is arranged to come out from the turbine section. The cooling flow is advantageously of the same vaporizable material as the working flow but in liquid form.

The above-presented cooling system facilitates constructing the electrical turbo-machine as a hermetic structure in a power plant where the bearings of the electrical turbo-machine are lubricated by the vaporizable material, a supply pump is directly connected to the rotor, and the vaporizable material in vaporized form fills the gas spaces of the electrical machine constituted by the stator and the rotor.

The cooling flow containing the vaporizable material in liquid form can be taken for example from a condenser tank or another element that contains the vaporizable material in liquid form. Furthermore, there can be a cooler for cooling the liquid taken from the condenser tank or the other element prior to using the liquid for cooling the electrical turbo-machine. The cooler can be for example a liquid-to-air heat exchanger or a liquid-to-liquid heat exchanger when e.g. sea water or other sufficiently cool liquid is available.

It is worth noting that in conjunction with some exemplifying and non-limiting embodiments of the invention, the above-mentioned first and second shaft sections of the rotor can be a same piece of material with at least a part of the electromagnetically active section of the rotor. On the other hand, in conjunction some other exemplifying and non-limiting embodiments of the invention, one or both of the first and second shaft sections of the rotor can be a separate piece of material with respect to the electromagnetically active section of the rotor.

In accordance with the invention, there is provided also a new power plant that is, advantageously but not necessarily, a steam power plant using water as the working fluid. A power plant according to the invention comprises:
  a boiler for vaporizing the working fluid,
  an electrical turbo-machine according to the invention for converting energy contained by the vaporized working fluid into electrical energy,
  a condenser for condensing the vaporized working fluid exiting from the electrical turbo-machine, and
  a pump system for pumping a first part the condensed working fluid to the boiler and a second part of the condensed working fluid to the electrical turbo-machine so as to cool the electrical turbo-machine with the condensed working fluid.

In power plants according to some exemplifying and non-limiting embodiments of the invention, the above-mentioned boiler comprises a superheater for superheating the working fluid. In these cases, the term "vaporized working fluid" means actually vaporized working fluid that has been superheated. Typically the superheater is advantageous is cases where the working fluid is water, whereas saturated vapor is typically more advantageous in cases where organic working fluid is used.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

Figure 1:
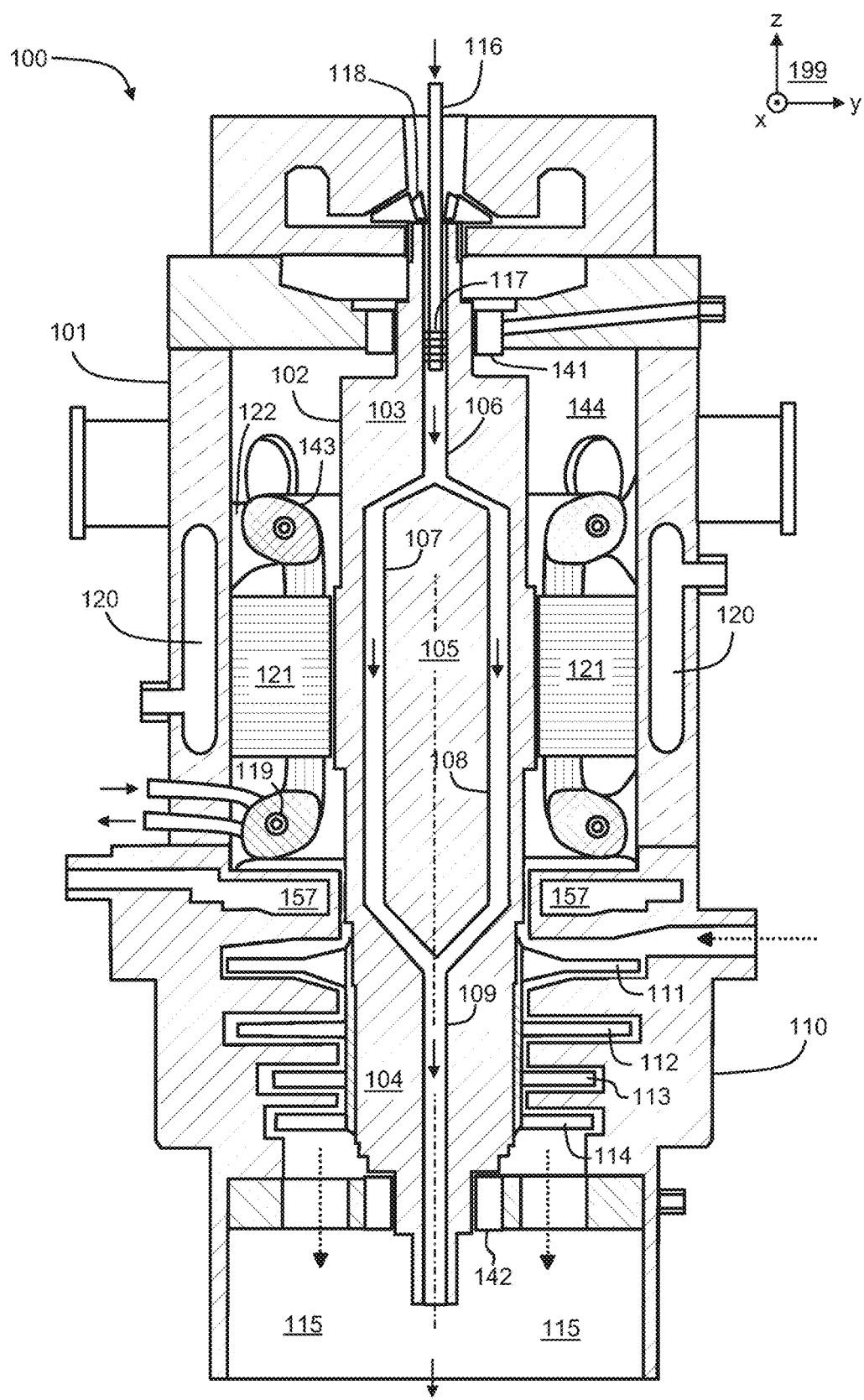
FIG. 1 shows a section view of an electrical turbo-machine according to an exemplifying and non-limiting embodiment of the invention.

FIG. 1 shows a section view of an electrical turbo-machine 100 according to an exemplifying and non-limiting embodiment of the invention. The section is taken along the yz-plane of a coordinate system 199. The electrical turbo-machine comprises a stator 101 and a rotor 102 for magnetically interacting with the stator. The rotor 102 is rotatably carried with bearings 141 and 142. In an exemplifying case where the electrical turbo-machine 100 is used as a turbo-generator of a steam power plant, the bearings 141 and 142 are advantageously water lubricated bearings. In another exemplifying case where the electrical turbo-machine 100 is used as a turbo-generator of a power plant using some other working fluid than water, e.g. an Organic Rankine Cycle "ORC" power plant, the bearings 141 and 142 are advantageously lubricated by the working fluid under consideration. The electrical turbo-machine further comprises a turbine section 110 which, in this exemplifying case, comprises turbine impellers 111, 112, 113, and 114. The turbine section 110 is capable of being driven with a working flow containing vaporizable material, for example water, in vaporized form. In FIG. 1, the working flow is depicted with dashed line arrows. The detailed construction of the turbine section, e.g. the number of the impellers etc., depends on the vaporizable material being used and/or on the desired operating conditions such as temperature, pressure drop, etc.

The stator 101 of the electrical turbo-machine comprises a ferromagnetic core structure 121 comprising, in this exemplifying case, a plurality of stator teeth and stator slots. The stator comprises windings comprising a plurality of stator coils arranged in the stator slots. It is also possible that the stator comprises air-gap windings and a toothless ferromagnetic core structure. The ferromagnetic core structure 121 is preferably made of steel sheets that are electrically insulated from each other and that are stacked in the direction parallel with the axial direction of the rotor 102. The axial direction is parallel with the z-direction of the coordinate system 199. The rotor 102 of the electrical turbo-machine comprises a first shaft section 103, a second shaft section 104, and electromagnetically active section 105 between the first and second shaft sections in the axial direction of the rotor. The electromagnetically active section 105 is capable of generating torque when magnetically interacting with the stator 101. The electromagnetically active section 105 may comprise permanent magnets for producing a magnetic flux penetrating the air-gap between the rotor and the stator. In this case, the electrical turbo-machine is capable of operating as a permanent magnet synchronous generator "PMSG". It is also possible that the electromagnetically active section 105 comprises electrically conductive structures so that the electrical turbo-machine is capable of operating as an asynchronous electrical machine. As illustrated in FIG. 1, the turbine impellers 111-114 are, or in some cases a single turbine impeller is, directly connected to the second shaft section 104 of the rotor.

The rotor 102 comprises cooling channels for receiving a cooling flow at the first shaft section 103, for conducting the cooling flow to the second shaft section, and for conducting the cooling flow out from the second shaft section 104. The cooling channels which are illustrated in FIG. 1 are denoted with reference numbers 106, 107, 108, and 109. In FIG. 1, the cooling flow is depicted with solid line arrows. The cooling flow is advantageously of the same vaporizable material as the working flow but in liquid form. As illustrated in FIG. 1, the second shaft section 104 is arranged to conduct the cooling flow through an area where the turbine impellers 111-114 are directly connected to the second shaft section and to conduct the cooling flow to a same room 115 to which the working flow is arranged to come out from the turbine section 110. As illustrated in FIG. 1, those portions of the cooling channels which are located in the electromagnetically active section 105 are farther from the axis of rotation of the rotor than the portion of the cooling channels for receiving the cooling flow at the first shaft section 103. It is advantageous that the cooling channels 107 and 108 are near to the air-gap surface of the rotor because most of the losses occurring in the rotor are generated on areas near by the air-gap surface. In the exemplifying case illustrated in FIG. 1, the cooling channel in the first shaft section 103 is a bore that is coaxial with the rotation axis of the rotor and suitable for receiving the cooling flow. The electrical turbo-machine comprises a supply tube 116 for supplying the cooling flow to the bore of the first shaft section 103. The supply tube can be fixed with respect to the stator, i.e. the rotor can be rotatable with respect to the supply tube. In this case, it is straightforward to arrange a hermetic joint between an outer surface of the supply tube and a casing of the electrical turbo-machine. There can be for example a contactless labyrinth seal 117 for providing sealing between the bore of the first shaft section and an end of the supply tube 116.

An electrical turbo-machine according to an exemplifying and non-limiting embodiment of the invention further comprises a pump impeller 118 which is directly connected to the first shaft section 103. The pump impeller is suitable for pumping liquid and it can be used as a feed pump when the electrical turbo-machine is used as a turbo-generator of a power plant. The pump impeller 118 can be for example a straight vane radial impeller of a "Barske"-type partial emission pump. In the exemplifying case illustrated in FIG. 1, the supply tube 116 and the first shaft section 103 of the rotor are arranged to conduct the cooling flow through an area where the pump impeller 118 is directly connected to the first shaft section. The cooling flow is arranged to axially enter the rotor and to flow through the pump impeller. It is also possible to supply the cooling flow radially via radial bores of the rotor. For example, the first shaft section may comprise radial bores suitable for receiving the cooling flow from the bearing 141 supporting the first shaft section and lubricated by material of the cooling flow. This requires, however, acting against the centrifugal force when supplying the cooling flow to the rotor. However, this can be compensated by having radial bores also at the cooling flow exit or some other design, e.g. vanes, which forces the cooling flow into rotary movement around the axis of rotation of the rotor so as provide centrifugal force based suction-effect at the cooling flow exit.

In an electrical turbo-machine according to an exemplifying and non-limiting embodiment of the invention, the windings of the stator are provided with tubular channels 119 for conducting a cooling flow. The tubular channels can be for example tubes made of plastic or other suitable material and placed among electrical wires of the windings. It is also possible that the electrical wires of the windings have a structure where electrically conductive threads have been woven around a tubular core. In such a case the cooling tubes can be made of electrically conductive material e.g. of stainless steel which tolerates well the erosive phenomena caused by the flow of warm water and also tolerate reliably the steam atmosphere. In this case, a galvanic separation of the cooling system has to be arranged outside of the electrical turbo-machine.

In an electrical turbo-machine according to an exemplifying and non-limiting embodiment of the invention, a frame structure of the stator comprises a room 120 surrounding the ferromagnetic core structure 121 of the stator and suitable for containing a liquid jacket for cooling the stator. The stator may further comprise solid material 122, for example special well-heat-conducting and steam-tolerant resin, arranged to provide heat-conducting relation between the end-windings of the stator and the frame structure of the stator.

When an electrical turbo-machine of the kind described above is used as a turbo-generator of a steam power plant, the gas-space 144 is typically filled with steam. The temperature of the steam filling the gas-space can be kept sufficiently low because the rotor 102 is cooled from inside by water and also the frame structure and/or the windings of the stator can be cooled by water. Furthermore, the frame structure of the stator can be provided with a room 157 for containing a liquid jacket for cooling a portion of the steam or other working fluid which leaks from an impeller chamber of the turbine section to the gas-space 144.

Figure 2A:
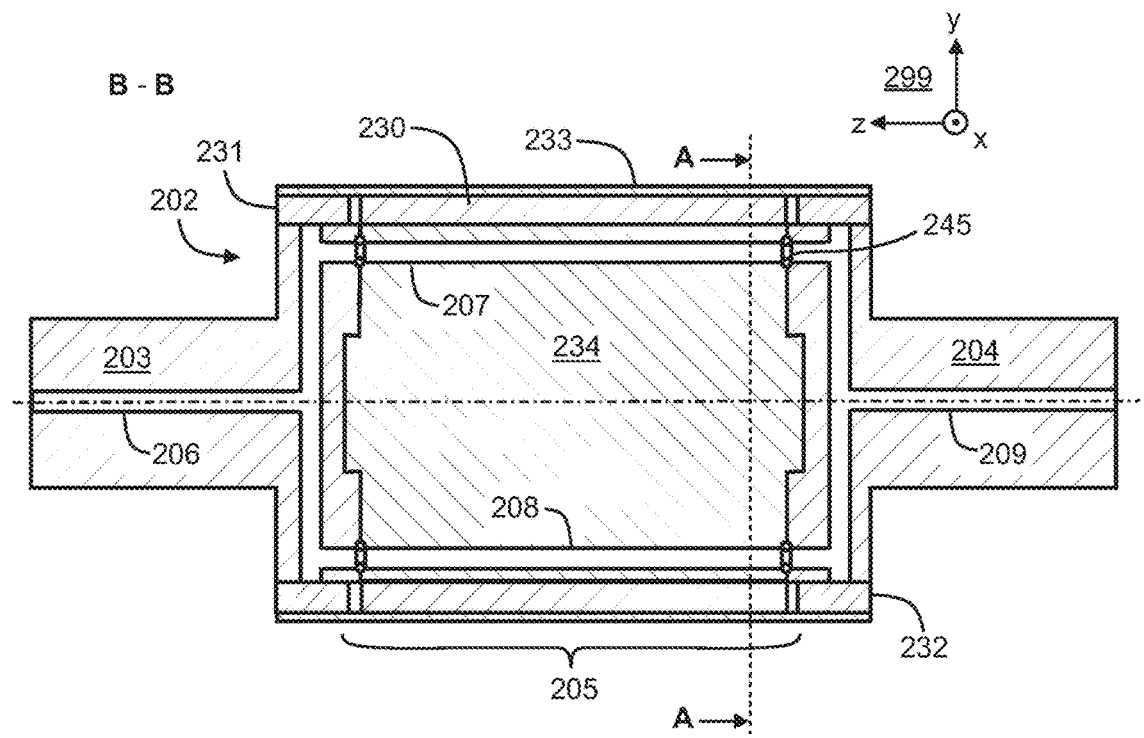
FIGS. 2a and 2b show section views of a rotor of an electrical turbo-machine according to an exemplifying and non-limiting embodiment of the invention.
Figure 2B:
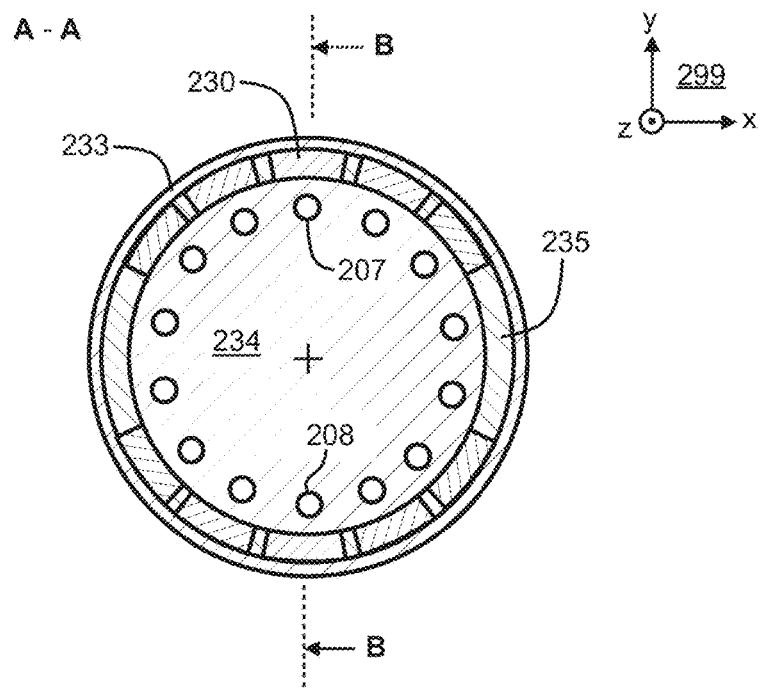

FIGS. 2a and 2b show section views of a rotor 202 of an electrical turbo-machine according to an exemplifying and non-limiting embodiment of the invention. The section shown in FIG. 2a is taken along a line B-B shown in FIG. 2b and the section plane is parallel with the yz-plane of a coordinate system 299. The section shown in FIG. 2b is taken along a line A-A shown in FIG. 2a and the section plane is parallel with the xy-plane of the coordinate system 299. The rotor 202 comprises a first shaft section 203, a second shaft section 204, and an electromagnetically active section 205 between the first and second shaft sections in the axial direction of the rotor, where the axial direction is the z-direction of the coordinate system 299. The rotor comprises cooling channels for conducting cooling fluid through the rotor. Some of the cooling channels are denoted with reference numbers 206, 207, 208, and 209 in FIGS. 2a and 2b. The electromagnetically active section 205 comprises permanent magnets and a ferromagnetic yoke section 234 constituting a part of the magnetic circuit for the magnetic flux between the rotor and the stator of an electrical machine. One of the permanent magnets is denoted with a reference number 230 in FIGS. 2a and 2b. The ferromagnetic yoke section 234 comprises axial bores for constituting the cooling channels within the ferromagnetic yoke section. Two of the axial bores are denoted with a reference numbers 207 and 208 in FIGS. 2a and 2b. The axial bores of the ferromagnetic yoke section can be lined with for example stainless steel or some other stainless material so as to protect the ferromagnetic yoke section against corrosion.

The elements constituting the first and second shaft sections 203 and 204 can be made of for example stainless steel. The ferromagnetic yoke section 234 and the elements constituting the first and second shaft sections 203 and 204 can be joined together for example by welding. The rotor may further comprise O-ring seals or other suitable sealing means for preventing the cooling fluid from accessing to the permanent magnets. One of the O-ring seals is denoted with a reference number 245 in FIG. 2a. The rotor comprises advantageously a tubular band structure 233 surrounding the electromagnetically active section 205 and supporting the electromagnetically active section in radial directions of the rotor. The tubular band structure 233 can be made of for example stainless steel or carbon fiber composite. It is also possible that the tubular band structure 233 comprises two nested bands so that the inner band is made of carbon fiber composite and the outer band is made of stainless steel. The inner band provides the support in radial directions and the outer band protects the inner band against substances which can be present in the air-gap of an electrical machine and which might damage the carbon fiber composite. Furthermore, the rotor comprises end-rings 231 and 232. The end-rings 231 and 232 can be made of for example stainless steel. In a case where there is the tubular band made of stainless steel, the said tubular band can be welded to the end-rings so as to achieve a stiff construction. The end-rings can be used for preventing the cooling fluid from accessing to the permanent magnets so that the end-rings are arranged to cover the joints between the elements constituting the first and second shaft sections 203 and 204 and the ferromagnetic yoke section 234. As can be seen from the section shown in FIG. 2b, the permanent magnets are positioned in this exemplifying case so that the rotor is advantageously a one-pole-pair rotor. Material 235 between the permanent magnets can be for example aluminum.

Figure 3A:
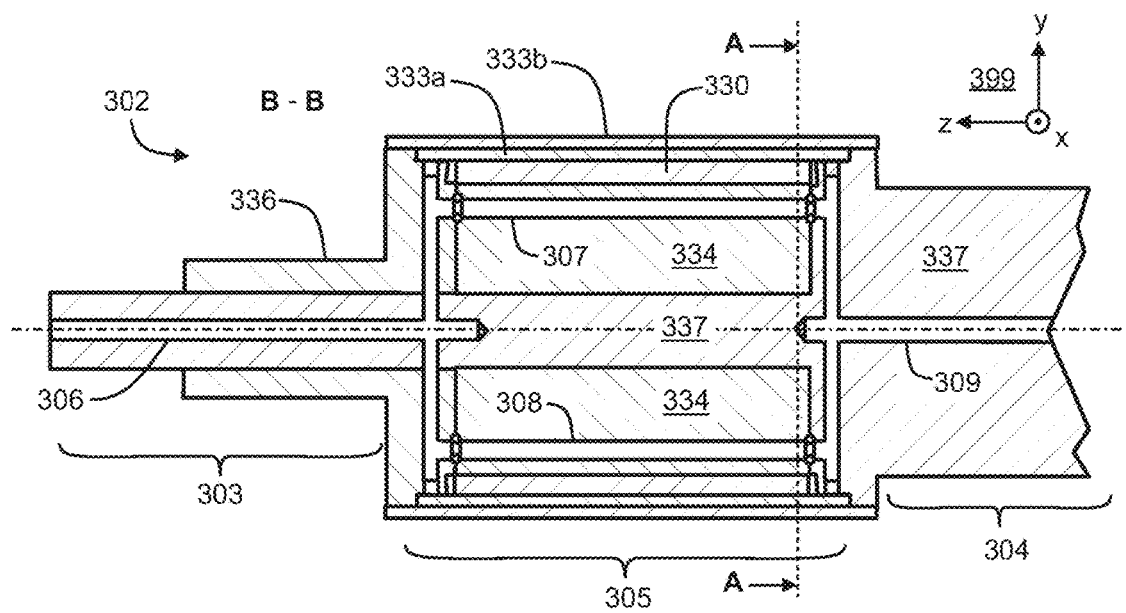
FIGS. 3a and 3b show section views of a rotor of an electrical turbo-machine according to an exemplifying and non-limiting embodiment of the invention.
Figure 3B:
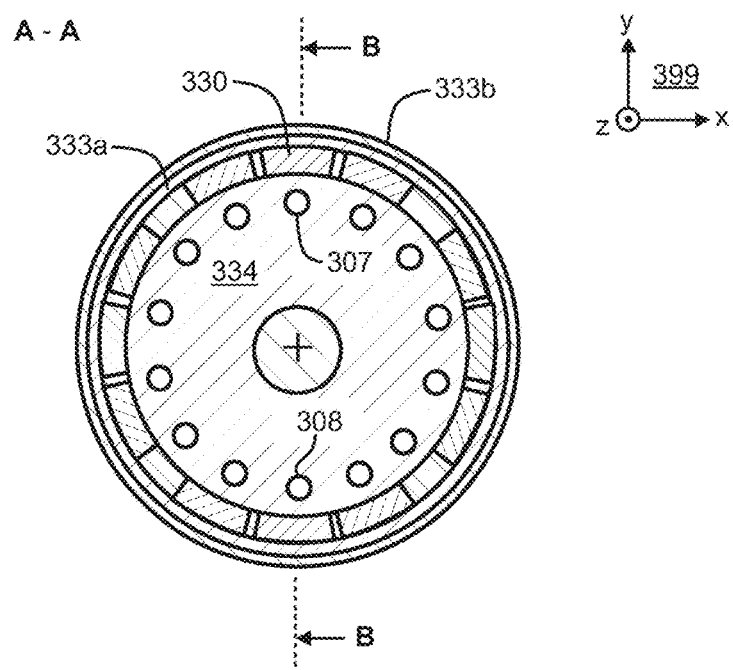

FIGS. 3a and 3b show section views of a rotor 302 of an electrical turbo-machine according to an exemplifying and non-limiting embodiment of the invention. The section shown in FIG. 3a is taken along a line B-B shown in FIG. 3b and the section plane is parallel with the yz-plane of a coordinate system 399. The section shown in FIG. 3b is taken along a line A-A shown in FIG. 3a and the section plane is parallel with the xy-plane of the coordinate system 399. The rotor 302 comprises a first shaft section 303, a second shaft section 304, and an electromagnetically active section 305 between the first and second shaft sections in the axial direction of the rotor, where the axial direction is the z-direction of the coordinate system 399. The rotor comprises cooling channels for conducting cooling fluid through the rotor. Some of the cooling channels are denoted with reference numbers 306, 307, 308, and 309 in FIGS. 3a and 3b. The electromagnetically active section 305 comprises permanent magnets and a ferromagnetic yoke section 334 constituting a part of the magnetic circuit for the magnetic flux between the rotor and the stator of an electrical machine. One of the permanent magnets is denoted with a reference number 330 in FIGS. 3a and 3b. The ferromagnetic yoke section 334 comprises axial bores for constituting the cooling channels within the ferromagnetic yoke section. Two of the axial bores are denoted with reference numbers 307 and 308 in FIGS. 3a and 3b. The axial bores of the ferromagnetic yoke section can be lined with for example stainless steel or some other stainless material so as to protect the ferromagnetic yoke section against corrosion. Elements 336 and 337 of the rotor can be made of for example stainless steel. The ferromagnetic yoke section 334 and the elements 336 and 337 can be joined together for example with a shrink fit and/or welding. The rotor comprises advantageously a tubular band structure surrounding the electromagnetically active section 305 and supporting the electromagnetically active section in radial directions of the rotor. In this exemplifying case, the tubular band structure comprises two nested bands 333a and 333b so that the inner band 333a is made of carbon fiber composite and the outer band 333b is made of stainless steel. The inner band provides the support in radial directions and the outer band protects the inner band against substances which can be present in the air-gap of an electrical machine and which might damage the carbon fiber composite. As can be seen from the section shown in FIG. 2b, the permanent magnets are positioned in this exemplifying case so that the rotor is advantageously a two-pole-pairs rotor.

Figure 4A:
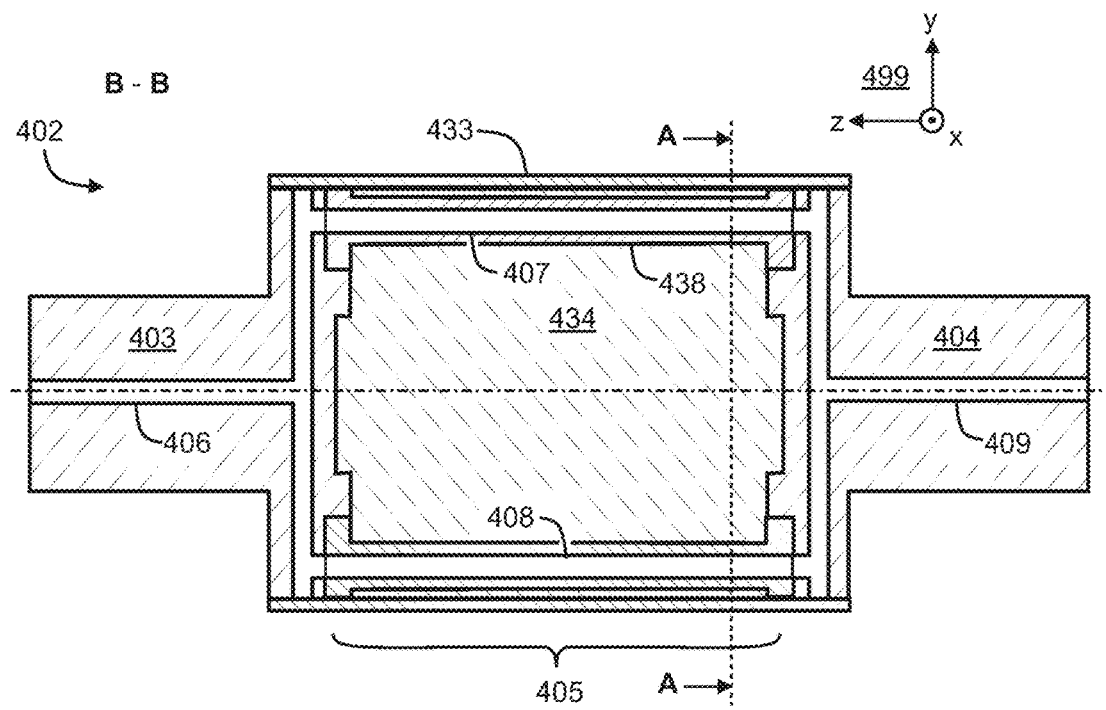
FIGS. 4a and 4b show section views of a rotor of an electrical turbo-machine according to an exemplifying and non-limiting embodiment of the invention.
Figure 4B:
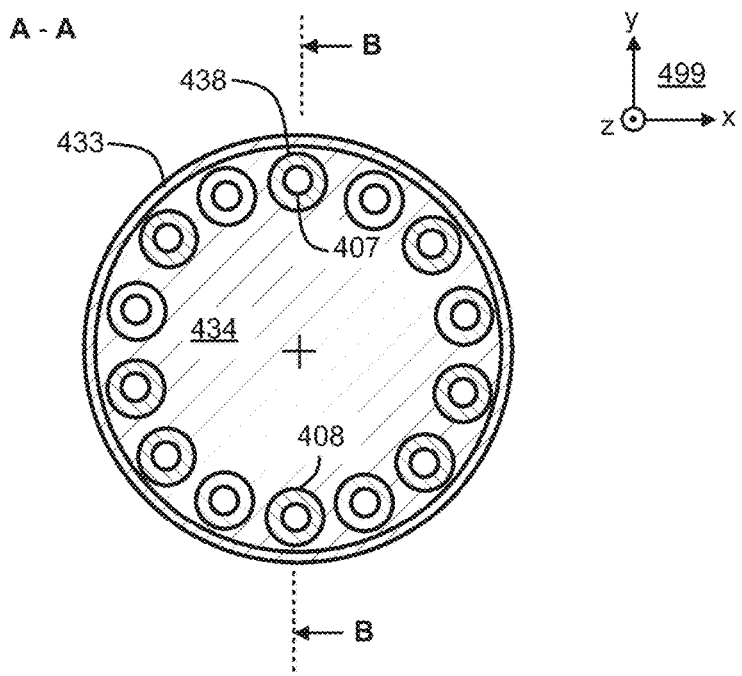

FIGS. 4a and 4b show section views of a rotor 402 of an electrical turbo-machine according to an exemplifying and non-limiting embodiment of the invention. The section shown in FIG. 4a is taken along a line B-B shown in FIG. 4b and the section plane is parallel with the yz-plane of a coordinate system 499. The section shown in FIG. 4b is taken along a line A-A shown in FIG. 4a and the section plane is parallel with the xy-plane of the coordinate system 499. The rotor 402 comprises a first shaft section 403, a second shaft section 404, and an electromagnetically active section 405 between the first and second shaft sections in the axial direction of the rotor, where the axial direction is the z-direction of the coordinate system 499. The rotor comprises cooling channels for conducting cooling fluid through the rotor. Some of the cooling channels are denoted with reference numbers 406, 407, 408, and 409 in FIGS. 4a and 4b. The electromagnetically active section 405 comprises a cage winding for carrying current and a ferromagnetic section 434 constituting a part of the magnetic circuit for the magnetic flux between the rotor and the stator of an electrical machine. Therefore, the rotor is suitable for an asynchronous machine. The cage winding comprises end-rings and bars between the end-rings. One of the bars is denoted with a reference number 438 in FIGS. 4a and 4b. The bars of the cage winding are tubular for constituting the cooling channels within the electromagnetically active section 405. The inner surfaces of the tubular bars of the cage winding can be lined with for example stainless steel or other stainless material so as to protect the bars against corrosion and/or erosion. The elements constituting the first and second shaft sections 403 and 404 can be made of for example stainless steel. The ferromagnetic section 434 and the elements constituting the first and second shaft sections 403 and 404 can be joined together for example by welding. The rotor comprises advantageously a tubular band structure 433 surrounding the electromagnetically active section 405 and supporting the electromagnetically active section in radial directions of the rotor. The tubular band structure 433 can be made of for example stainless steel or carbon fiber composite. It is also possible that the tubular band structure 433 comprises two nested bands so that the inner band is made of carbon fiber composite and the outer band is made of stainless steel. The inner band provides the support in radial directions and the outer band protects the inner band against substances which can be present in the air-gap of an electrical machine and which might damage the carbon fiber composite.

Figure 5:
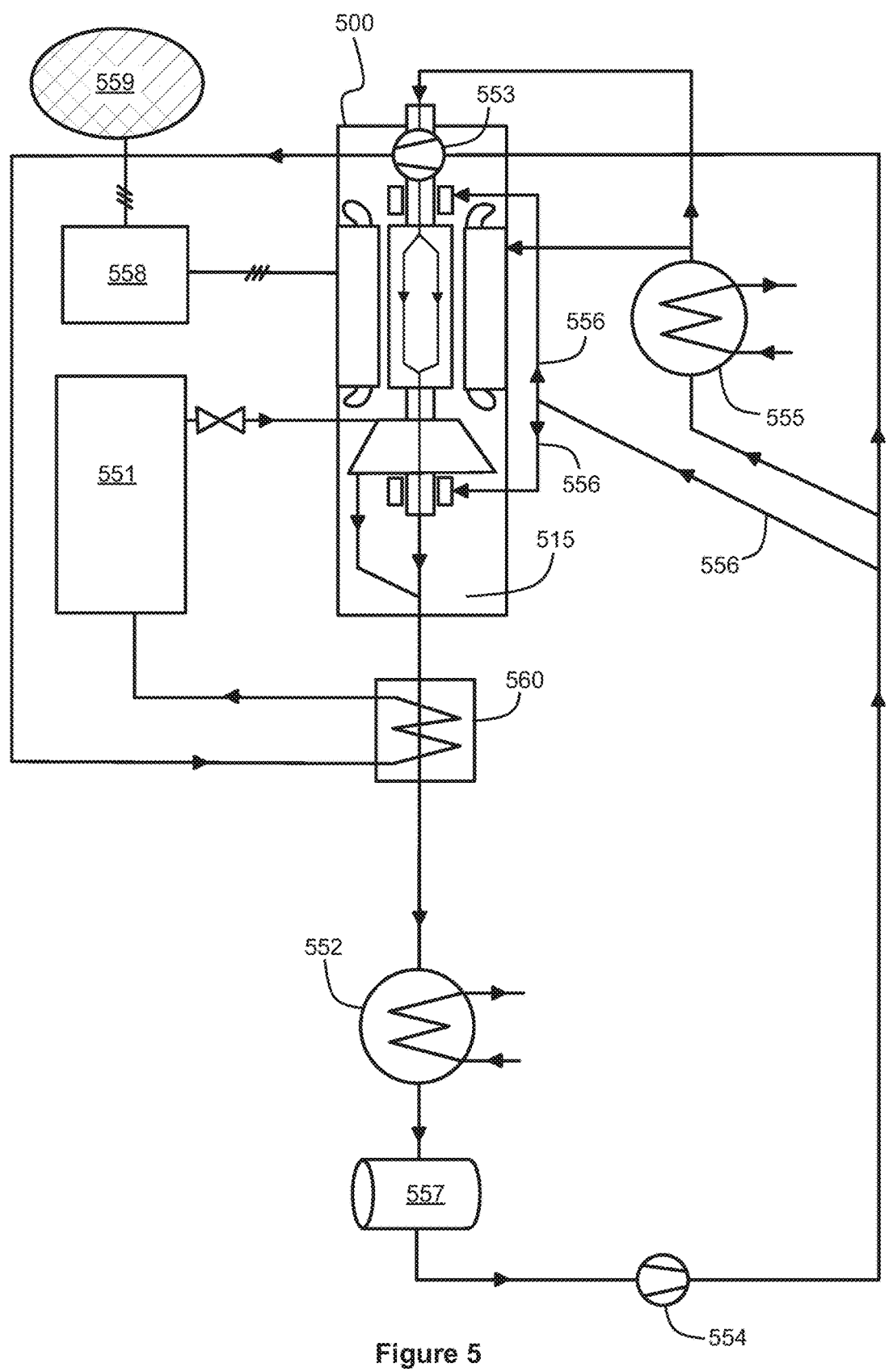
FIG. 5 shows a schematic illustration of a power plant according to an exemplifying and non-limiting embodiment of the invention.

FIG. 5 shows a schematic illustration of a power plant according to an exemplifying and non-limiting embodiment of the invention. The power plant is advantageously a steam power plant that uses water as the working fluid. In some cases it is also possible that power plant is for example an Organic Rankine Cycle "ORC" energy converter that uses suitable organic fluid as the working fluid. The organic fluid can be, for example but not necessarily, one of siloxanes. The power plant comprises a boiler 551 for vaporizing the working fluid and an electrical turbo-machine 500 for converting energy contained by the vaporized working fluid into electrical energy. The electrical energy is supplied to a power grid 559 with the aid of a frequency converter 558. The electrical turbo-machine 500 comprises a turbine section for converting the energy contained by the vaporized working fluid into mechanical energy and a generator section for converting the mechanical energy into the electrical energy. The generator section comprises a stator and a rotor for magnetically interacting with the stator. The turbine section comprises one or more impellers which are directly connected to the rotor of the generator section. The electrical turbo-machine 500 can be such as described above with reference to FIG. 1, and the rotor of the generator section can be such as described above with reference to FIGS. 2a and 2b, or to FIGS. 3a and 3b, or to FIGS. 4a and 4b. The rotor of the generator section comprises cooling channels so that the working fluid in liquid form can be arranged to flow through the rotor and to come out from the rotor to the same room 515 to which the working fluid is arranged to come out from the turbine section of the electrical turbo-machine.

The power plant comprises a condenser 552 for condensing the vaporized working fluid exiting from the electrical turbo-machine and a pump system for pumping a first part of the condensed working fluid to the boiler 551 and a second part of the condensed working fluid to the electrical turbo-machine 500 so as to cool the electrical turbo-machine with the condensed working fluid. In the exemplifying case illustrated in FIG. 5, the pump system comprises a feed pump 553 whose impeller is directly connected to the rotor of the generator section of the electrical turbo-machine. The pump system further comprises a pre-feed pump 554 which is arranged to supply the condensed working fluid from a condenser tank 557 to the feed pump 553 and to the electrical turbo-machine 500. The power plant comprises advantageously a cooler 555 for cooling the condensed working fluid used for cooling the electrical turbo-machine prior to supplying the condensed working fluid to the electrical turbo-machine. The cooler 555 and the condenser 552 can be for example liquid-to-air heat exchangers or liquid-to-liquid heat exchangers when e.g. sea water or other sufficiently cool liquid is available.

In the exemplifying case illustrated in FIG. 5, the power plant comprises channels 556 for conducting the condensed working fluid to the bearings of the electrical turbo-machine 500 so as to lubricate the bearings with the condensed working fluid. Advantageously, the electrical turbo-machine 500 comprises a hermetic casing for preventing the working fluid from leaking to the ambient air and for preventing the ambient air from accessing to the working fluid. Furthermore, the power plant may comprise a recuperator 560 for increasing the efficiency of the energy conversion.

The specific examples provided in the description given above should not be construed as limiting. Therefore, the invention is not limited merely to the embodiments described above.

What is claimed is:

1. An electrical turbo-machine comprising:
   a stator;
   a rotor comprising:
      a first shaft section and a second shaft section,
      an electromagnetically active section between the first and second shaft sections in an axial direction of the rotor and for generating torque when magnetically interacting with the stator,
      cooling channels for receiving a cooling flow at the first shaft section, for conducting the cooling flow to the second shaft section, and for conducting the cooling flow out from the second shaft section; and
   a turbine section capable of being driven with a working flow and comprising one or more turbine impellers directly connected to the second shaft section,
   wherein the second shaft section is arranged to conduct the cooling flow through an area where the one or more turbine impellers are directly connected to the second shaft section and to conduct the cooling flow to a same room to which the working flow is arranged to come out from the turbine section.

2. The electrical turbo-machine according to claim 1, wherein portions of the cooling channels located in the electromagnetically active section are farther from an axis of rotation of the rotor than a portion of the cooling channels for receiving the cooling flow at the first shaft section.

3. The electrical turbo-machine according to claim 1, wherein the electromagnetically active section comprises permanent magnets and a ferromagnetic yoke section constituting a part of a magnetic circuit for a magnetic flux between the rotor and the stator, and the ferromagnetic yoke section comprises axial bores for constituting the cooling channels within the ferromagnetic yoke section.

4. The electrical turbo-machine according to claim 3, wherein the axial bores of the ferromagnetic yoke section are lined with stainless material so as to prevent corrosion of the ferromagnetic yoke section.

5. The electrical turbo-machine according to claim 1, wherein the rotor comprises a tubular band structure surrounding the electromagnetically active section and supporting the electromagnetically active section in radial directions of the rotor.

6. The electrical turbo-machine according to claim 1, wherein the first shaft section comprises a hole coaxial with the rotation axis of the rotor and suitable for receiving the cooling flow,
   the electrical turbo-machine further comprises a supply tube for supplying the cooling flow to the hole of the first shaft section.

7. The electrical turbo-machine according to claim 6, wherein the rotor is rotatable with respect to the supply tube and there is a contactless labyrinth seal for providing sealing between the hole of the first shaft section and an end of the supply tube.

8. The electrical turbo-machine according to claim 1, wherein the second shaft section is arranged to force the cooling flow into rotary movement around an axis of rotation of the rotor when the rotor is rotating and when the cooling flow exits the second shaft section so as provide a suction-effect based on centrifugal force.

9. The electrical turbo-machine according to claim 1, wherein the electrical turbo-machine further comprises a pump impeller directly connected to the first shaft section, the pump impeller being suitable for pumping liquid.

10. The electrical turbo-machine according to claim 9, wherein the first shaft section is arranged to conduct the cooling flow through an area where the pump impeller is directly connected to the first shaft section.

11. The electrical turbo-machine according to claim 1, wherein a frame structure of the stator comprises a room surrounding a ferromagnetic core structure of the stator and configured to contain a liquid jacket for cooling the stator.

12. The electrical turbo-machine according to claim 1, wherein a frame structure of the stator comprises a room for containing a liquid jacket for cooling a portion of the working flow leaking from an impeller chamber of the turbine section to a gas-space of an electrical machine comprising the rotor and the stator.

13. The electrical turbo-machine according to claim 11, wherein the stator comprises solid material arranged to provide heat-conducting relation between end-windings of the stator and the frame structure of the stator.

14. A power plant comprising:
a boiler for vaporizing working fluid;
an electrical turbo-machine for converting energy contained by the vaporized working fluid into electrical energy;
a condenser for condensing the vaporized working fluid exiting from the electrical turbo-machine; and
a pump system for pumping a first part of the condensed working fluid to the boiler and a second part of the condensed working fluid to the electrical turbo-machine so as to cool the electrical turbo-machine with the condensed working fluid,
wherein the electrical turbo-machine comprises
a stator,
a rotor comprising:
a first shaft section and a second shaft section,
an electromagnetically active section between the first and second shaft sections in an axial direction of the rotor and for generating torque when magnetically interacting with the stator, and
cooling channels for receiving the second part of the condensed working fluid at the first shaft section, for conducting the second part of the condensed working fluid to the second shaft section, and for conducting the second part of the condensed working fluid out from the second shaft section; and
a turbine section capable of being driven with the vaporized working fluid and comprising one or more turbine impellers directly connected to the second shaft section,
wherein the second shaft section is arranged to conduct the second part of the condensed working fluid through an area where the one or more turbine impellers are directly connected to the second shaft section and to conduct the second part of the condensed working fluid to a same room to which the vaporized working fluid is arranged to come out from the turbine section.

15. The power plant according to claim 14, wherein the power plant comprises a cooler for cooling the second part of the condensed working fluid prior to supplying the second part of the condensed working fluid to the electrical turbo-machine.

16. The electrical turbo-machine according to claim 2, wherein the electromagnetically active section comprises permanent magnets and a ferromagnetic yoke section constituting a part of a magnetic circuit for a magnetic flux between the rotor and the stator, and the ferromagnetic yoke section comprises axial bores for constituting the cooling channels within the ferromagnetic yoke section.

17. The electrical turbo-machine according to claim 16, wherein the axial bores of the ferromagnetic yoke section are lined with stainless material so as to prevent corrosion of the ferromagnetic yoke section.

18. The electrical turbo-machine according to claim 2, wherein the rotor comprises a tubular band structure surrounding the electromagnetically active section and supporting the electromagnetically active section in radial directions of the rotor.

19. The electrical turbo-machine according to claim 2, wherein the first shaft section comprises a hole coaxial with the rotation axis of the rotor and suitable for receiving the cooling flow and, and the electrical turbo-machine comprises a supply tube for supplying the cooling flow to the hole of the first shaft section.

20. The electrical turbo-machine according to claim 12, wherein the stator comprises solid material arranged to provide heat-conducting relation between end-windings of the stator and the frame structure of the stator.

\* \* \* \* \*